P. S. CLINGER.
Hand-Plow.
No. 27,694.
Patented Apr. 3, 1860.
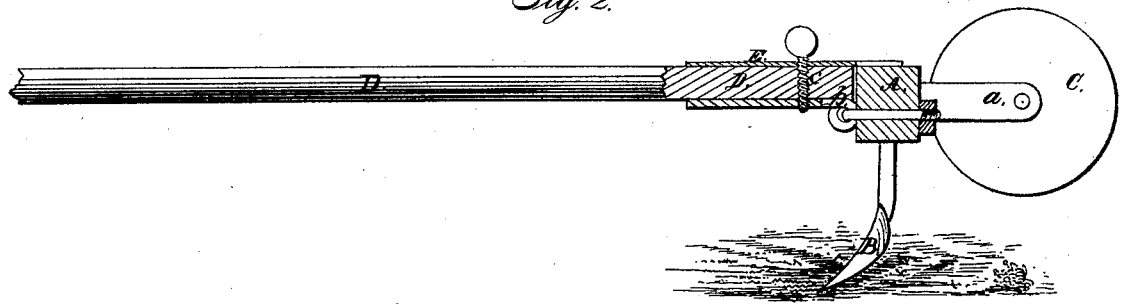
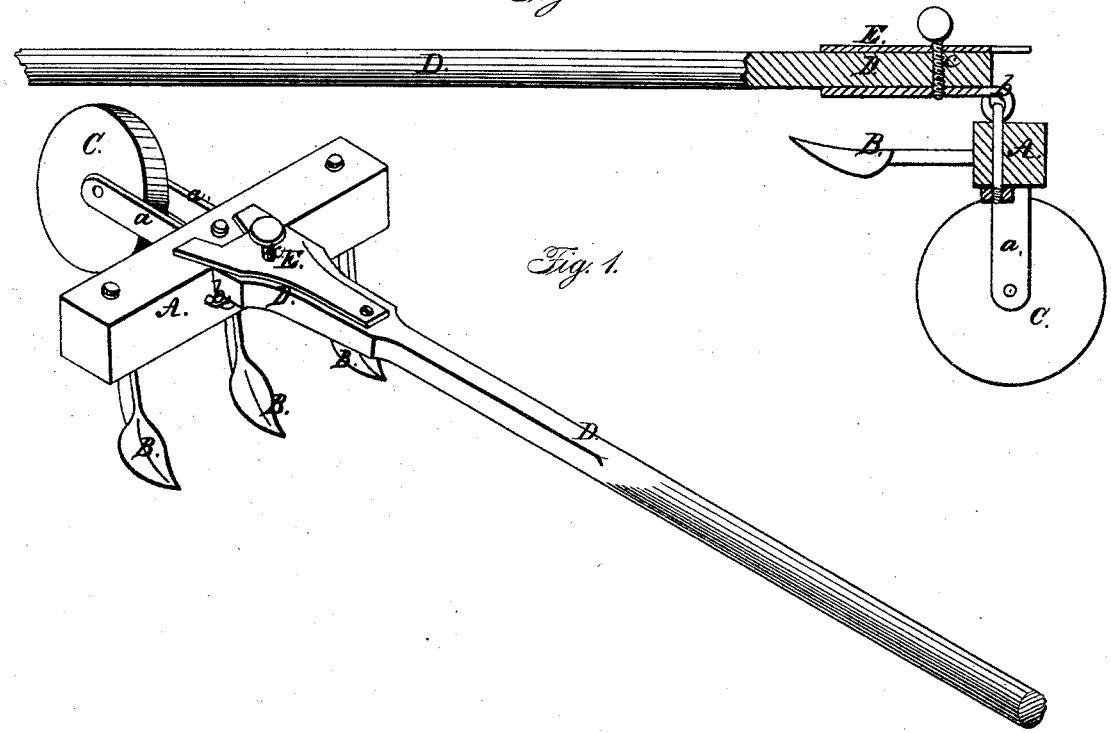

UNITED STATES PATENT OFFICE.

P. S. CLINGER, OF CONESTOGA CENTRE, PENNSYLVANIA.

IMPROVEMENT IN HAND-CULTIVATORS.

Specification forming part of Letters Patent No. 27,694, dated April 3, 1860.

*To all whom it may concern:*

Be it known that I, P. S. CLINGER, of Conestoga Centre, in the county of Lancaster and State of Pennsylvania, have invented a new and useful Improvement in Hand-Cultivators, and I do hereby declare that the following is a full, clear, and exact description of the same, reference being had to the accompanying drawings, forming a part of this specification, in which—

Figure 1 is a perspective view of my improved implement. Fig. 2 is a longitudinal section of the same with its teeth in operative position; and Fig. 3 shows a similar section of the same, the teeth being out of operative position.

Similar letters of reference in each of the several figures indicate corresponding parts.

The nature of my invention consists in the arrangement of the hinged bar, cultivator-teeth, roller, handle, and stop or check plate, in the manner and for the purposes hereinafter described.

To enable others skilled in the art to make and use my invention, I will proceed to describe its construction and operation.

A represents a head-piece or bar, provided with shovel or other shaped cultivating-teeth B.

C is a roller, hung between bracket $a$ $a$ projecting out from the rear of the head-piece or bar, A.

D is a handle, to which the head-piece A is hinged, as shown at $b$, so that it may turn down at right angles, as represented in Fig. 3.

E is a check-plate, attached to the top of the handle at such a point that it crosses the joint between the head-piece and handle. This check-plate is made adjustable by a set-screw, $c$. The check-plate prevents the head-piece or bar A from turning upward beyond a certain point, and the set-screw serves to raise or lower the plate and thus cause the shovels to have a greater or less angle, as may be desired.

The implement described is very simple and need not be heavier than an ordinary hand-rake. It is operated by moving back and forward. When it is pushed backward the hinge allows the wheel to fall upon the ground and the teeth to rise above the ground, as shown in Fig. 3. Now, by pulling it forward the teeth descend into the ground and the wheel arises to its original position, as shown in Fig. 2. The operation described effectually cultivates the ground and leaves it in a loose, friable condition.

The peculiarity of the implement lies in the hinged bar and roller combined with the handle and check-plate in such a manner that the teeth are caused by one movement to take a hold upon the soil and by another or reverse movement to free themselves ready for a new action.

What I claim as my invention, and desire to secure by Letters Patent, is—

The arrangement of the hinged head-piece or bar A, cultivating-teeth B, roller C, handle D, and check-plate E, substantially as and for the purposes set forth.

P. S. CLINGER.

Witnesses:
S. G. MUSSER,
JACOB STAUFFER.